(12) United States Patent
Yano

(10) Patent No.: US 9,280,275 B2
(45) Date of Patent: Mar. 8, 2016

(54) DEVICE, METHOD, AND STORAGE MEDIUM STORING PROGRAM

(71) Applicant: KYOCERA CORPORATION, Kyoto-shi, Kyoto (JP)

(72) Inventor: Tatsuya Yano, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 272 days.

(21) Appl. No.: 13/686,125

(22) Filed: Nov. 27, 2012

(65) Prior Publication Data

US 2013/0135236 A1 May 30, 2013

(30) Foreign Application Priority Data

Nov. 28, 2011 (JP) .................. 2011-259403
Nov. 26, 2012 (JP) .................. 2012-257644

(51) Int. Cl.
*G06F 3/0488* (2013.01)
(52) U.S. Cl.
CPC .................... *G06F 3/0488* (2013.01)
(58) Field of Classification Search
CPC ............... G06F 3/0483; G06F 3/0488

USPC ............. 345/173–179; 178/18.01–20.04
See application file for complete search history.

(56) References Cited

U.S. PATENT DOCUMENTS

| | | | |
|---|---|---|---|
| 2006/0284852 A1* | 12/2006 | Hofmeister et al. | 345/173 |
| 2008/0165160 A1 | 7/2008 | Kocienda et al. | |
| 2011/0316888 A1* | 12/2011 | Sachs et al. | 345/667 |
| 2012/0159364 A1* | 6/2012 | Hyun | 715/766 |

FOREIGN PATENT DOCUMENTS

WO 2008086302 A1 7/2008

* cited by examiner

*Primary Examiner* — Alexander Eisen
*Assistant Examiner* — Cory Almeida
(74) *Attorney, Agent, or Firm* — Hauptman Ham, LLP

(57) ABSTRACT

According to an aspect, a device includes a touch screen display and a controller. The controller displays a home screen in a layer on the touch screen display. The controller displays a different home screen in the same layer when a first gesture is performed on the home screen displayed on the touch screen display. The controller displays a home screen in a different layer when a second gesture is performed on the home screen displayed on the touch screen display.

12 Claims, 11 Drawing Sheets

DEVICE, METHOD, AND STORAGE MEDIUM STORING PROGRAM

CROSS-REFERENCE TO RELATED APPLICATIONS

This application claims priority from Japanese Application No. 2011-259403, filed on Nov. 28, 2011, and Japanese Application No. 2012-257644, filed on Nov. 26, 2012, the contents of which are incorporated by reference herein in their entireties.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture.

An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of touch screen devices display a screen called a home screen on a display. Objects called icons are arranged on the home screen. When detecting a gesture on an icon, a touch screen device executes an application associated with an icon on which the gesture is made.

As the number of applications installed in the touch screen device increases, the number of icons arranged on the home screens increases. If the number of icons increases, the number of home screens on which the icons are arranged increases; accordingly, it becomes difficult for the user to manage the home screens.

For the foregoing reasons, there is a need for a device, a method, and a program, which can systematically manage home screens.

SUMMARY

According to an aspect, a device includes a touch screen display and a controller. The controller displays a home screen in a layer on the touch screen display. The controller displays a different home screen in the same layer when a first gesture is performed on the home screen displayed on the touch screen display. The controller displays a home screen in a different layer when a second gesture is performed on the home screen displayed on the touch screen display.

According to another aspect, a method is for controlling a device including a touch screen display. The method includes: displaying a home screen in a layer on the touch screen display; displaying a different home screen in the same layer when a first gesture is performed on the home screen displayed on the touch screen display; and displaying a home screen in a different layer when a second gesture is performed on the home screen displayed on the touch screen display.

According to another aspect, a non-transitory storage medium stores a program. When executed by a device including a touch screen display, the program causes the device to execute: displaying a home screen in a layer on the touch screen display; displaying a different home screen in the same layer when a first gesture is performed on the home screen displayed on the touch screen display; and displaying a home screen in a different layer when a second gesture is performed on the home screen displayed on the touch screen display.

DETAILED DESCRIPTION

Exemplary embodiments of the present invention will be explained in detail below with reference to the accompanying drawings. A smartphone will be explained below as an example of a device provided with a touch screen.

Figure 1:
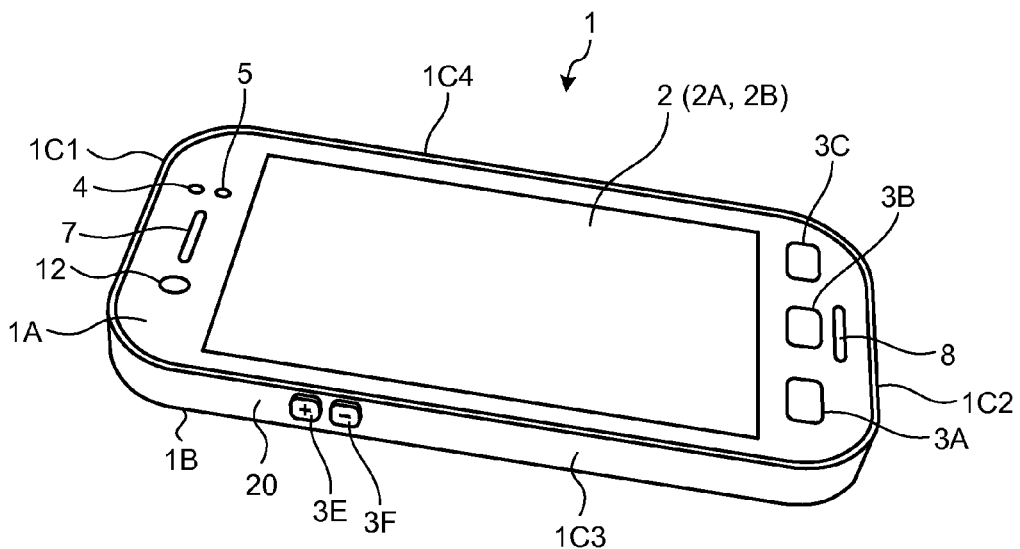
FIG. 1 is a perspective view of a smartphone according to an embodiment.
Figure 2:
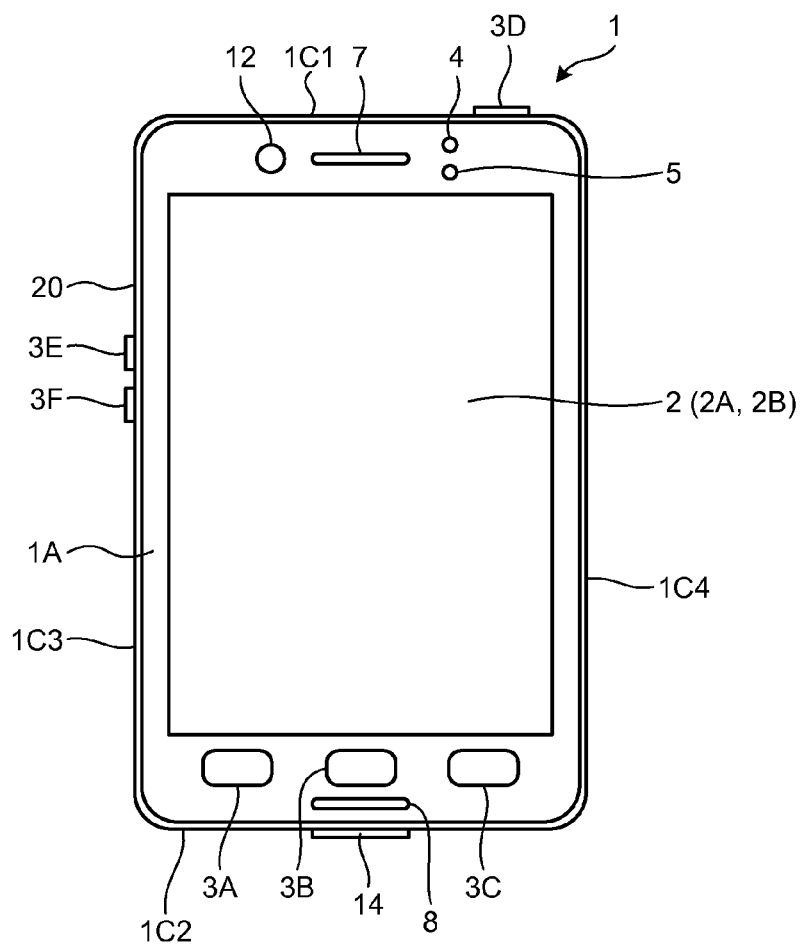
FIG. 2 is a front view of the smartphone.
Figure 3:
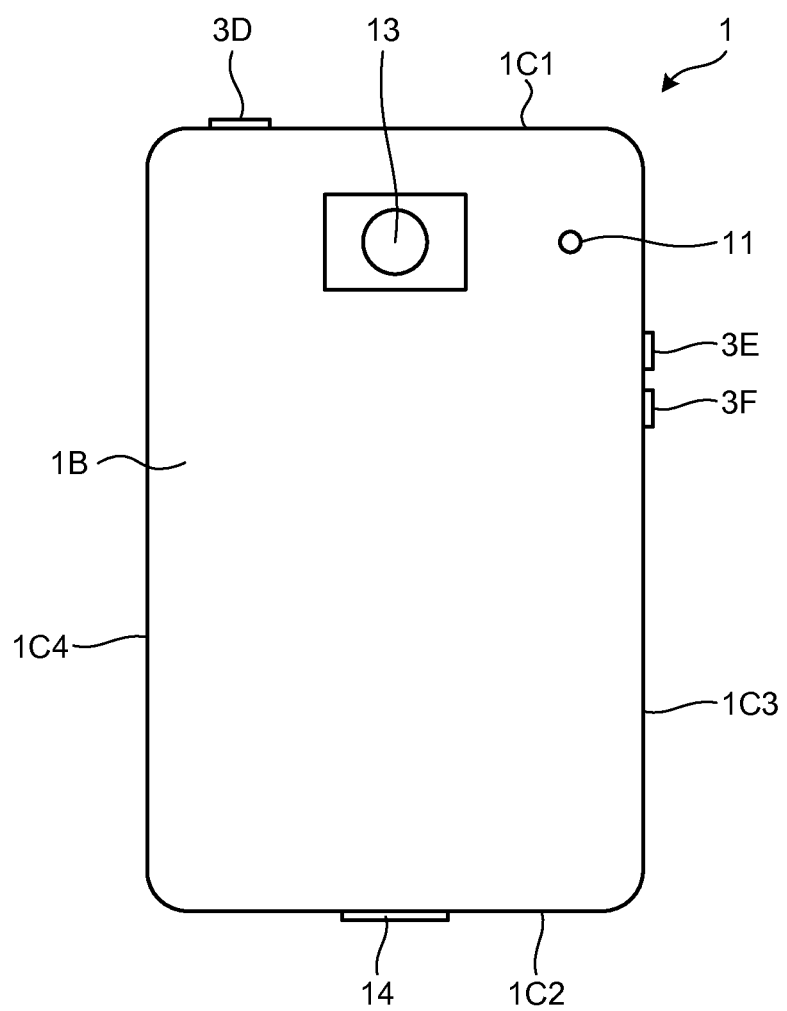
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. The smartphone 1 determines a gesture in which one finger makes contact with the touch screen 2B as single-touch. The smartphone 1 determines a gesture in which a plurality of fingers make contact with the touch screen 2B as multi-touch. When detecting the multi-touch, the smartphone 1 detects a number of the fingers whose contact is detected. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, "leftward flick" in which the finger moves leftward on the screen, "diagonally left upward flick" in which the finger moves in the diagonally left upward direction on the screen, "diagonally left downward flick" in which the finger moves in the diagonally left downward direction on the screen, "diagonally right upward flick" in which the finger moves in the diagonally right upward direction on the screen, "diagonally right downward flick" in which the finger moves in the diagonally right downward direction on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
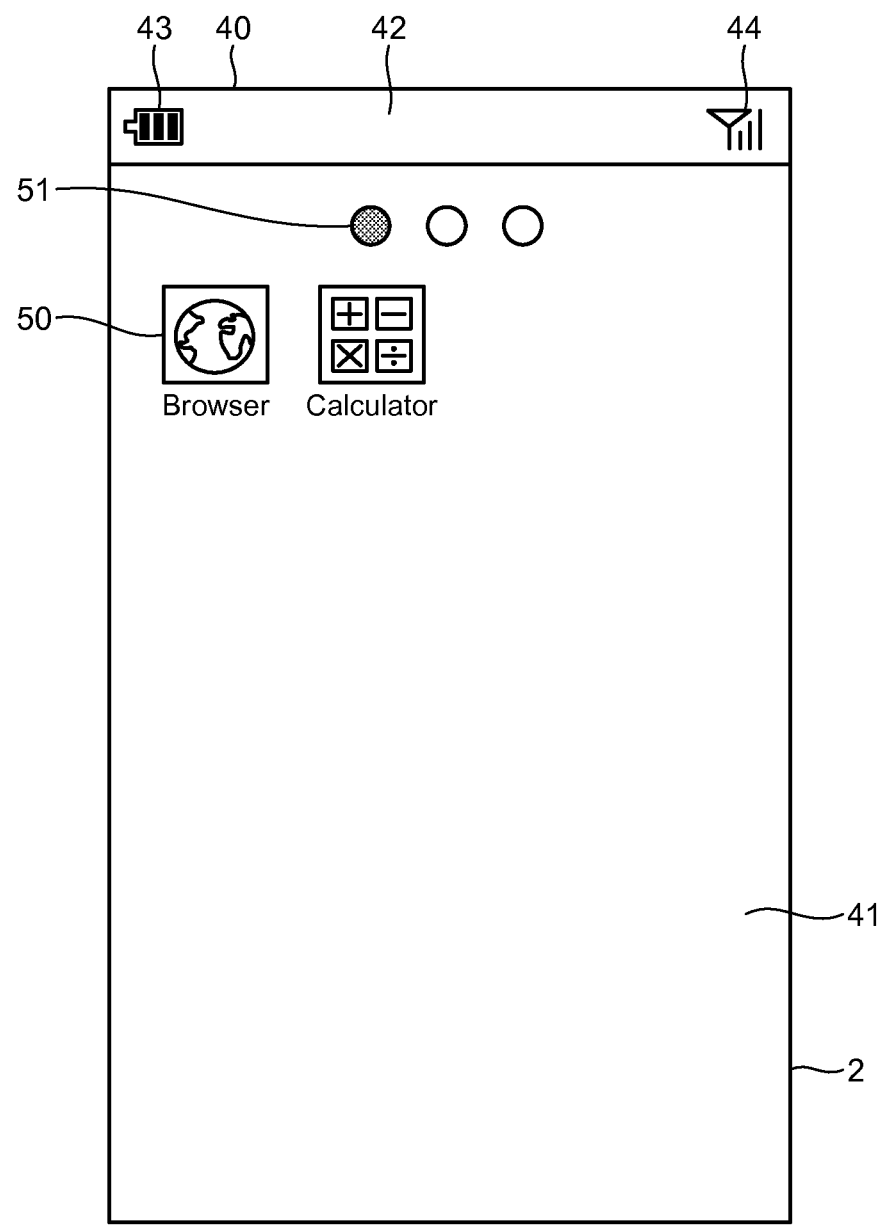
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. The indicator 51 indicates which one of the home screens is currently displayed. In the indicator 51, a symbol corresponding to a home screen that is currently displayed is displayed in a different mode from symbols corresponding to the other home screens.

In the example illustrated in FIG. 4, a locator 51 including three symbols is displayed. This indicates that the number of the home screens 40 is three. The three symbols are circular, respectively. In the example illustrated in FIG. 4, the leftmost symbol is displayed in a different mode from the other symbols. In other words, the symbols except the leftmost symbol are displayed as circular outlines, but the leftmost symbol is displayed in a state where its circular outline is filled in. This indicates that the leftmost home screen 40 is currently being displayed on the display 2A.

When detecting a gesture in a lateral direction during display of the home screen 40, the smartphone 1 changes the home screen 40 to be displayed on the display 2A in accordance with the gesture. For example, when detecting a rightward flick, the smartphone 1 changes the home screen 40 to be displayed on the display 2A to the home screen 40 immediately on the left. For example, when detecting a leftward flick, the smartphone 1 changes the home screen 40 to be displayed on the display 2A to the home screen 40 immediately on the right. The details of the process of the smartphone 1 changing the home screen 40 in the lateral direction in accordance with a flick gesture in a left or right direction are given below. When changing the home screen 40 in the lateral direction, the smartphone 1 updates the display of the locator 51 according to the position of the changed home screen 40.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The up and down directions of the home screen 40 are directions relative to the up and down directions of a character or image displayed on the display 2A. Therefore, with respect to the home screen 40, a side close to the area 42 in a longitudinal direction of the touch screen display 2 is the top side of the home screen 40, and a side away from the area 42 is the bottom side of the home screen 40. A side where the radio-wave level mark 44 is displayed in the area 42 is the right side of the home screen 40, and a side where the remaining mark 43 is displayed in the area 42 is the left side of the home screen 40. The smartphone 1 determines, for example, a diagonally left upward direction, diagonally right downward direction, left direction, or right direction of the home screen 40, based on the up and down directions of a character or image displayed on the home screen 40.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
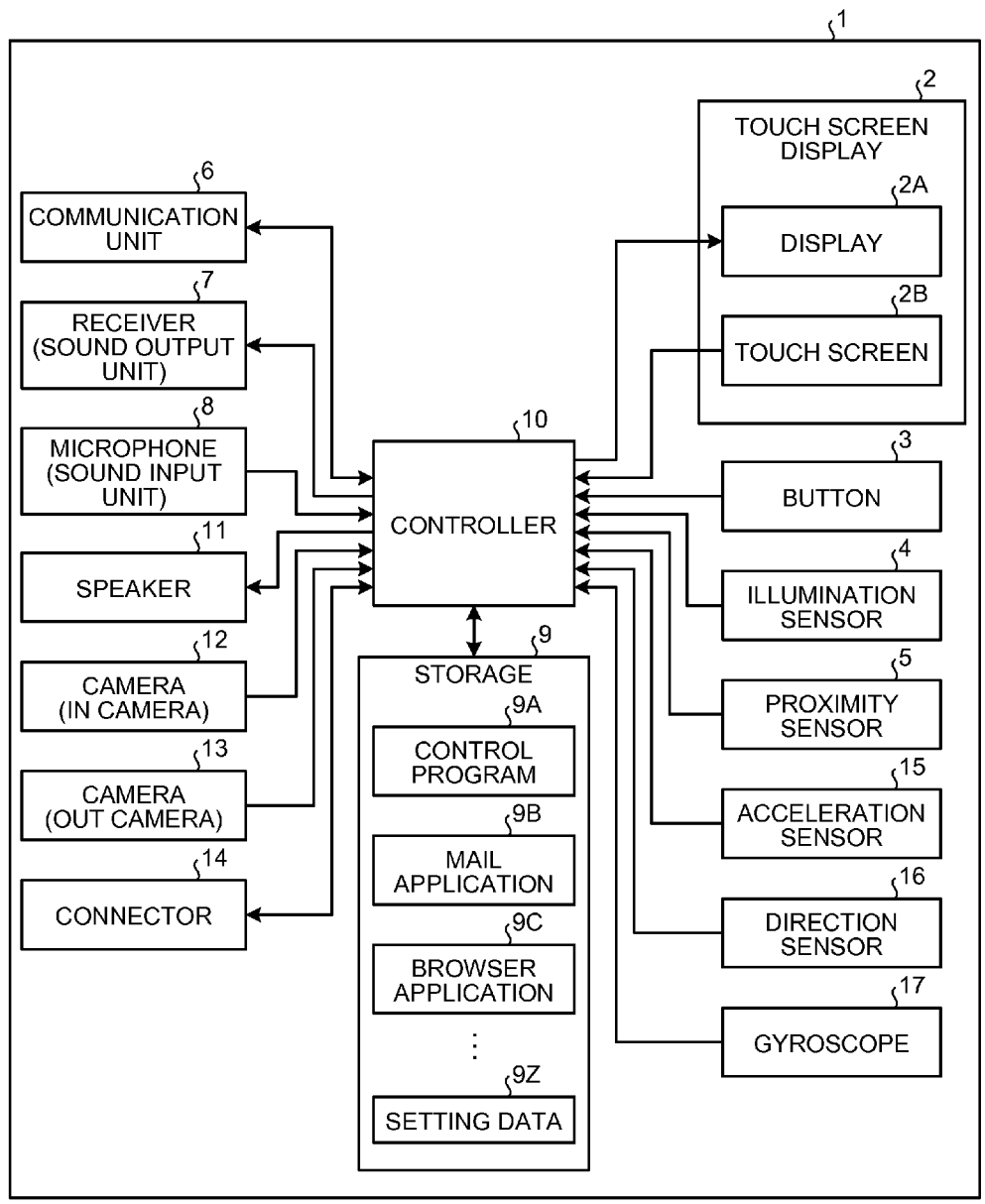
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, and setting data 9Z. The mail application 9B provides an e-mail function. The e-mail function enables the composition, transmission, receipt, and display, and the like of an e-mail. The browser application 9C provides a WEB browsing function. The WEB browsing function enables the display of a WEB page, the edition of a bookmark, and the like. The setting data 9Z provides various setting functions related to the operations of the smartphone 1.

The control program 9A provides functions related to various control for operating the smartphone 1. The control program 9A controls, for example, the communication unit 6, the receiver 7, and the microphone 8 to make a phone call. The functions provided by the control program 9A include the function of changing the home screen 40 to be displayed in accordance with a gesture. The functions provided by the control program 9A can be used in combination with a function provided by another program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform various controls, such as a control for changing the home screen 40 to be displayed in accordance with a gesture.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

A description will hereinafter be given of a process of the smartphone 1 changing the home screens 40 in accordance with the user's gesture on the touch screen display 2A with reference to FIGS. 6 to 10.

The smartphone 1 not only increases or decreases the number of the home screens 40 in the lateral direction, but also increases or decreases the number of the home screens 40 in the vertical direction by increasing or decreasing the number of layers to which the home screens 40 belong. In other words, the smartphone 1 hierarchically configures the home screens. The smartphone 1 determines the number of layers to which the home screens belong, for example, in accordance with the user's setting. If the number of layers is plural, the smartphone 1 displays one home screen belonging to the selected layer on the display 2A.

Figure 6:
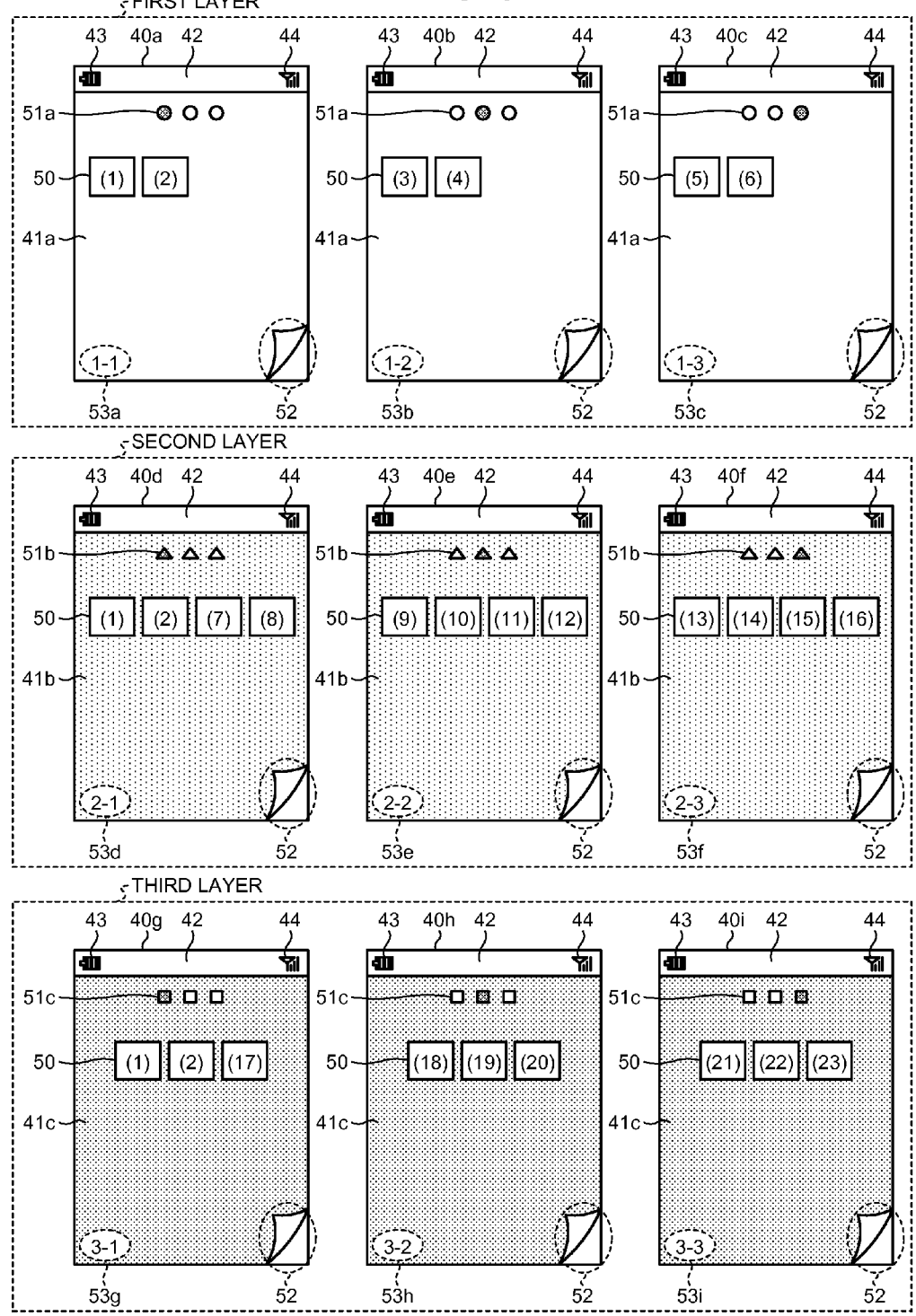
FIG. 6 is a diagram illustrating an example of home screens configured hierarchically.

The smartphone 1 manages home screens by a hierarchy. A description will be given of an example of home screens configured hierarchically with reference to FIG. 6. FIG. 6 illustrates an example of home screens configured hierarchically (in other words, a plurality of home screens configuring a hierarchical structure). FIG. 6 illustrates an example of a configuration where three layers of first, second, and third layers each including three home screens, as the example of home screens configured hierarchically. As illustrated in FIG. 6, the first layer includes three home screens 40a, 40b and 40c, the second layer includes three home screens 40d, 40e, and 40f, and the third layer includes three home screens 40g, 40h, and 40i. In the following description, a description may be omitted of parts common to the home screen 40 illustrated in FIG. 4.

When displaying the home screens configured hierarchically on the display 2A, the smartphone 1 displays a predetermined object 52 indicating that the home screens are configured according to a plurality of layers, at the bottom right corner of the home screen. In the example illustrated in FIG. 6, the object 52 represents a state where a part of a wall paper is curling up. In other words, the object 52 indicates to be in a state where, when a predetermined gesture is detected, a home screen belonging to a current layer is turned, and a home screen belonging to another layer appears from under the home screen. The position to provide the object 52 is not limited to the right downward corner of the home screen. For example, the position of the object 52 may be the bottom left corner of the home screen.

When detecting a gesture in a diagonal direction during display of the home screen, the smartphone 1 moves layers in accordance with the gesture, and changes the home screen to be displayed on the display 2A. For example, when detecting a diagonally left upward flick on the home screen, the smartphone 1 changes the home screen to be displayed on the display 2A to the leftmost home screen belonging to a layer immediately below a layer to which the current home screen belongs. For example, when detecting a diagonally right downward flick on the home screen, the smartphone 1 changes the home screen to be displayed on the display 2A to the leftmost home screen belonging to a layer immediately above a layer to which the current home screen belongs.

The smartphone 1 may detect a gesture on the object 52. For example, when detecting a diagonally left upward flick from an area where the object 52 is displayed, the smartphone 1 may change the home screen to be displayed on the display 2A to the leftmost home screen belonging to a layer immediately below a layer to which the current home screen belongs. For example, when detecting a diagonally right downward flick up to the area where the object 52 is displayed, the smartphone 1 may change the home screen to be displayed on the display 2A to the leftmost home screen belonging to a layer immediately above a layer to which the current home screen belongs. The details of the process of the smartphone 1 moving layers in accordance with a flick gesture in the diagonal direction and changing the current home screen will be described below.

The smartphone 1 changes the display mode of the home screen in accordance with a layer to which each of the plurality of home screens, which is displayed on the display 2A, belongs. For example, upon moving layers and changing the home screen, the smartphone 1 changes the display mode of the symbols of the locator 51 in accordance with the layer. Specifically, the smartphone 1 changes the shape of the symbols of the locator in accordance with the layer. In the example illustrated in FIG. 6, the shape of the symbols of a locator 51a displayed on the home screens 40a, 40b and 40c that belong to the first layer is circular. The shape of the symbols of a locator 51b displayed on the home screens 40d, 40e, and 40f that belong to the second layer is triangular. The shape of the symbols of a locator 51c displayed on the home screens 40g, 40h, and 40i that belong to the third layer is square.

For example, when the layer to which the home screen being displayed belongs is the first layer, the smartphone 1 displays the circular locator 51a on the home screen 40a, 40b, or 40c that belongs to the first layer. For example, when detecting a diagonally left upward flick during display of the home screen 40a, 40b, or 40c and moving to the second layer, the smartphone 1 displays the triangular locator 51b on the home screen 40d, 40e, or 40f that belongs to the second layer. For example, when detecting a diagonally left upward flick during display of the home screens 40d, 40e, and 40f and moving to the third layer, the smartphone 1 displays the square locator 51c on the home screen 40g, 40h, or 40i that belongs to the third layer. The example of changing the display mode of the symbols of the locator 51 in accordance with the layer is not limited to the change in shape of the symbols. For example, the smartphone 1 may change the color of the symbols of the locator 51 in accordance with the layer. When changing the home screen in the lateral direction after moving to each layer, the smartphone 1 updates the display of the locators 51a, 51b, or 51c according to the position of the home screen after the change in the lateral direction.

The smartphone 1 changes a wall paper to be set on the home screen in accordance with the layer. For example, as illustrated in FIG. 6, when detecting a diagonally left upward flick on any of the home screens 40a, 40b, and 40c where a background 41a is set, and moving to the home screen 40d in the second layer, the smartphone 1 displays a background 41b being a different background from the background 41a, as the background of the home screen 40d, in the background of the icons 50. When detecting a diagonally left upward flick on any of the home screens 40*d*, 40*e*, and 40*f* where the background 41*b* is set, and moving to the home screen 40*g* in the third layer, the smartphone 1 displays a background 41*c* being a different background from the background 41*b*, as the background of the home screen 40*g*, in the background of the icons 50.

When displaying one of the home screens configured hierarchically on the display 2A, the smartphone 1 displays a layer number identifying the position of each home screen in the plurality of layers, at the bottom left corner of the home screen. In the example illustrated in FIG. 6, the layer number uniquely identifying the position of each home screen is displayed at the bottom left corner of each of the home screens 40*a* to 40*i*.

For example, "1-1" is displayed on the home screen 40*a* as a layer number 53*a* indicating to be a home screen located at the left end in the first layer. "1-2" is displayed on the home screen 40*b* as a layer number 53*b* indicating to be a home screen located second from the left in the first layer. "1-3" is displayed on the home screen 40*c* as a layer number 53*c* indicating to be a home screen located third from the left in the first layer, in other words, at the right end in the first layer. "2-1" is displayed on the home screen 40*d* as a layer number 53*d* indicating to be a home screen located at the left end in the second layer. "2-2" is displayed on the home screen 40*e* as a layer number 53*e* indicating to be a home screen located second from the left in the second layer. "2-3" is displayed on the home screen 40*f* as a layer number 53*f* indicating to be a home screen located third from the left in the second layer, in other words, at the right end in the second layer. "3-1" is displayed on the home screen 40*g* as a layer number 53*g* indicating to be a home screen located at the left end in the third layer. "3-2" is displayed on the home screen 40*h* as a layer number 53*h* indicating to be a home screen located second from the left in the third layer. "3-3" is displayed on the home screen 40*i* as a layer number 53*i* indicating to be a home screen located third from the left in the third layer, in other words, at the right end in the third layer.

When the number of home screens or the number of layers is increased or decreased by the user's setting, the smartphone 1 stores in the storage 9 layer number information indicating the positional relationships of the home screens configured hierarchically. The smartphone 1 displays an associated layer number on each home screen based on the layer number information previously stored in the storage 9. The position to display the layer number is not limited to the bottom left corner of the home screen. For example, the position to display the layer number may be the bottom right corner of the home screen.

When displaying one of the home screens configured hierarchically on the display 2A, the smartphone 1 restricts the arrangement of the same icon on different home screens in the same layer. The smartphone 1 executes control to permit the arrangement of icons common between layers in different layers. As illustrated in FIG. 6, the smartphone 1 imposes restrictions such that the icons 50 arranged on the home screen 40*a* in the first layer are different from icons arranged on the home screen 40*b* in the first layer. The smartphone 1 performs control to permit the arrangement of icons common between the icons arranged on the home screen 40*a* in the first layer and icons arranged on the home screen 40*d* in the second layer. For the sake of simplicity, different icons to which numbers 1 to 23 are assigned are displayed on the home screens illustrated in FIG. 6. Icons having different numbers indicate that they are different icons. Icons having the same number indicate that they are the same icon.

In the example illustrated in FIG. 6, icons (1) and (2) arranged on the home screen 40*a* in the first layer, icons (3) and (4) arranged on the home screen 40*b* in the first layer, and icons (5) and (6) arranged on the home screen 40*c* in the first layer are different from one another. Icons (1), (2), (7), and 8 arranged on the home screen 40*d* in the second layer, icons (9), (10), (11), and (12) arranged on the home screen 40*e* in the second layer, and icons (13), (14), (15), and (16) arranged on the home screen 40*f* in the second layer are different icons from one another. Icons (1), (2), and (17) arranged on the home screen 40*g* in the third layer, icons (18), (19), and (20) arranged on the home screen 40*h* in the third layer, and icons (21), (22), and (23) arranged on the home screen 40*i* in the third layer are different icons from one another. On the other hand, the icons (1) and (2) arranged on the home screen 40*a* in the first layer, the icons (1) and (2) arranged on the home screen 40*d* in the second layer, and the icons (1) and (2) arranged on the home screen 40*g* in the third layer are the same icons.

In the smartphone 1 in the embodiment, it is assumed that the number of layers is three, and the number of home screens in each layer is three; however, the numbers are not limited to them. The smartphone 1 can increase or decrease the number of home screens in each layer, and increase or decrease the number of layers to which the home screens belong. The smartphone 1 can determine the number of layers to which the home screens belong in accordance with the user's setting.

With respect to the home screen, the smartphone 1 displays another home screen in the same layer in accordance with a flick gesture in the left or right direction, and moves the layers of the home screens to be displayed in accordance with a flick gesture in the diagonal direction to display a home screen in a different layer.

Figure 7:
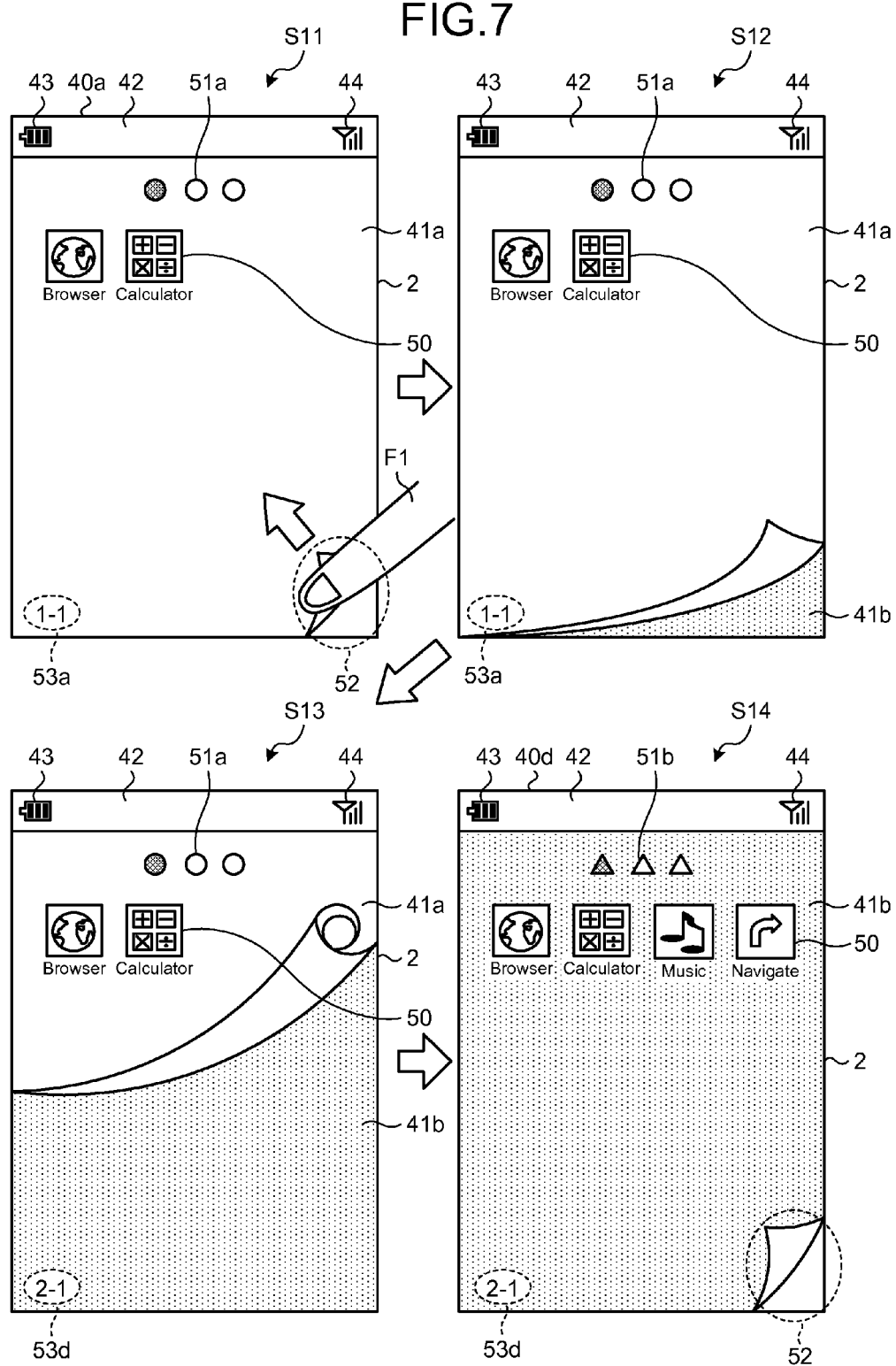
FIG. 7 is a diagram illustrating a first example of control performed by the smartphone.

FIG. 7 is a diagram illustrating a first example of control performed by the smartphone 1 according to the embodiment. The smartphone 1 displays the home screen 40*a* on the display 2A at Step S11. A "Browser" icon (icon (1)) and a "Calculator" icon (icon (2)) are arranged in the top left area of the home screen 40*a* and below the locator 51*a*. The smartphone 1 displays the leftmost home screen 40*a* on the display 2A at Step S11 and accordingly displays the leftmost symbol of the locator 51*a* in a state where its circular outline is filled in. The smartphone 1 displays the home screen 40*a* located at the left end in the first layer on the display 2A at Step S11 and accordingly displays "1-1" as the layer number 53*a* at the bottom left corner of the screen. The smartphone 1 displays the background 41*a* set in the first layer in the background of the icons 50 at Step S11.

At Step S11, a finger F1 of the user performs a diagonally left upward flick on the home screen 40*a* from the area where the object 52 is displayed. The smartphone 1 detects that the number of fingers whose contact has been detected in the area where the object 52 is displayed is one. When detecting the diagonally left upward flick following the single touch with one finger on the object 52 on the home screen 40*a*, the smartphone 1 displays the home screen 40*d* being a home screen located at the left end in the second layer, instead of the home screen 40*a*, on the display 2A. In other words, when the flick gesture in the diagonally left upward direction is a gesture that follows single touch and flicks while moving in the diagonally left upward direction, the smartphone 1 moves to the second layer next after the first layer to change home screens. At this point, as illustrated at Steps S12 and S13, the smartphone 1 displays such that the home screen 40*a* in the first layer is turned and the home screen 40*d* in the second layer appears from under the home screen 40*a*.

At Step S12, the area where the icons 50 are arranged on the home screen 40a is displayed to look like curling up from the bottom right corner where the object 52 has been displayed. A part of the home screen 40a curls up; accordingly, a part of the background 41b of the home screen 40d appears.

At Step S13, the home screen 40a is displayed to look like further curling up than Step S12. The home screen 40a further curls up; accordingly, the layer number "2-1" of the home screen 40d appears.

At Step S14, the smartphone 1 displays the home screen 40d on the display 2A. The "Browser" icon, the "Calculator" icon, a "Music" icon (icon (7)), and a "Navigate" icon (icon (8)) are arranged in the top left area of the home screen 40d and below the locator 51b. The smartphone 1 displays the home screen 40d in the second layer on the display 2A at Step S14 and accordingly changes the shape of the symbols of the locator 51b from a circle to a triangle. The smartphone 1 displays the leftmost home screen 40d on the display 2A and accordingly displays the leftmost symbol of the locator 51b in a state where its triangular outline is filled in. The smartphone 1 displays the home screen 40d located at the left end in the second layer on the display 2A at Step S14 and accordingly displays "2-1" as the layer number 53d at the bottom left corner of the screen. The smartphone 1 displays the background 41b set in the second layer in the background of the icons 50 at Step S14.

In the first example, the description has been given only of the example where, when detecting a flick gesture in the diagonally left upward direction on the home screen, the smartphone 1 moves to a layer below a current layer to change home screens. However, when detecting a flick gesture in the diagonally right downward direction on the home screen, the smartphone 1 moves to a layer above the current layer to change home screens. At this point, the smartphone 1 may change the display mode to a state where the object 52 representing the state where a part of the home screen is curling up is closed, in other words, a state where the home screen does not curl up, and may subsequently move to a layer above the current layer to change home screens.

In the first example, the description has been given of the example where, when detecting a flick gesture in the diagonally left upward direction, the smartphone 1 sets the starting point to the area where the object 52 is displayed. However, the area is not limited to this. When detecting a flick gesture in the diagonally left upward direction along the diagonal line of the home screen even in an area where the object 52 is not displayed, the smartphone 1 may move to a layer below the current layer to change home screens. The same applies to a case where the smartphone 1 detects a flick gesture in the diagonally right downward direction on the home screen, and moves to a layer above the current layer to change home screens.

Figure 8:
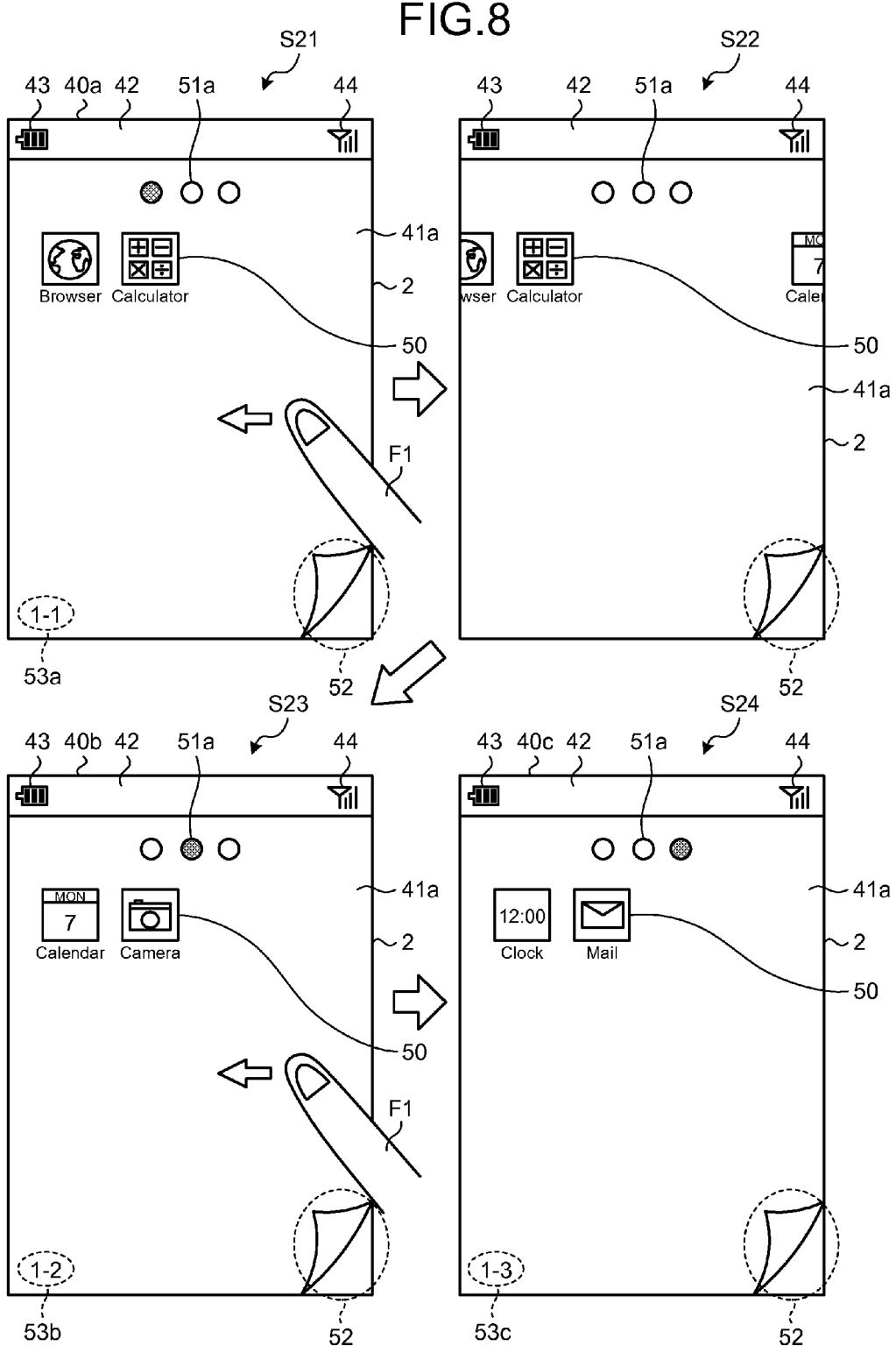
FIG. 8 is a diagram illustrating a second example of control performed by the smartphone.

FIG. 8 is a diagram illustrating a second example of control performed by the smartphone 1 according to the embodiment. As illustrated at Step S21, the smartphone 1 displays the home screen 40a on the display 2A. The "Browser" icon (icon (1)) and the "Calculator" icon (icon (2)) are arranged in the top left area of the home screen 40a and below the locator 51a. The smartphone 1 displays the leftmost home screen 40a on the display 2A at Step S21 and accordingly displays the leftmost symbol of the locator 51a in a state where its circular outline is filled in. The smartphone 1 displays the home screen 40a located at the left end in the first layer on the display 2A at Step S21 and accordingly displays "1-1" as the layer number 53a at the bottom left corner of the screen. The smartphone 1 displays the background 41a set in the first layer in the background of the icons 50 at Step S21.

The finger F1 of the user performs a leftward flick on the home screen 40a at Step S21. When detecting the leftward flick on the home screen 40a, the smartphone 1 displays the home screen 40b located to the right of the home screen 40a, instead of the home screen 40a, on the display 2A. At this point, as illustrated at Steps S22 and S23, the smartphone 1 scrolls to the left of the display 2A to display the home screens 40a and 40b, and the icons 50 arranged respectively on the home screens 40a and 40b.

Step S22 illustrates a state where the home screen is changing. With the scrolling of the home screen, the smartphone 1 displays in a manner of gradually moving the "Browser" icon and the "Calculator" icon outside the display area of the display 2A. At Step S22, a part (the right half) of the "Browser" icon is displayed, while cut in half, at the left end of the display area of the display 2A. At Step S22, a part (the left half) of the "Calendar" icon (icon (3)) that is not displayed at Step S21 is displayed, while cut in half, at the right end of the display area of the display 2A.

At Step S23, the smartphone 1 displays the home screen 40b on the display 2A. The "Calendar" icon and a "Camera" icon (icon (4)) are arranged in the top left area of the home screen 40b. At Step S23, the smartphone 1 displays the symbol second from the left of the locator 51a in a state where its circular outline is filled in. At this point, the smartphone 1 displays the leftmost symbol of the locator 51a, which is displayed in a state where its circular outline is filled in at Step S21, as a circular outline. The smartphone 1 displays the home screen 40b located second from the left in the first layer on the display 2A at Step S23 and accordingly displays "1-2" as the layer number 53b at the bottom left corner of the screen.

The finger F1 of the user performs a leftward flick on the home screen 40b at Step S23. When detecting a leftward flick on the home screen 40b, the smartphone 1 displays the home screen 40c being a home screen located to the right of the home screen 40b, instead of the home screen 40b, on the display 2A at Step S24. In FIG. 8, omitted is a diagram illustrating a change that the home screen is making from the state illustrated at Step S23 to the state illustrated at S24.

At Step S24, the smartphone 1 displays the home screen 40c on the display 2A. At Step S24, a "Clock" icon (icon (5)) and a "Mail" icon (icon (6)) are arranged in the top left area of the home screen 40c. At Step S24, the smartphone 1 displays the symbol third from the left of the locator 51a, in other words, the rightmost symbol in a state where its circular outline is filled in. At this point, the symbol second from the left of the locator 51a, which is displayed in a state where its circular outline is filled in at Step S23, as a circular outline. The smartphone 1 displays the home screen 40c located third from the left in the first layer on the display 2A at Step S24 and accordingly displays "1-3" as the layer number 53c at the bottom left corner of the screen.

Figure 9:
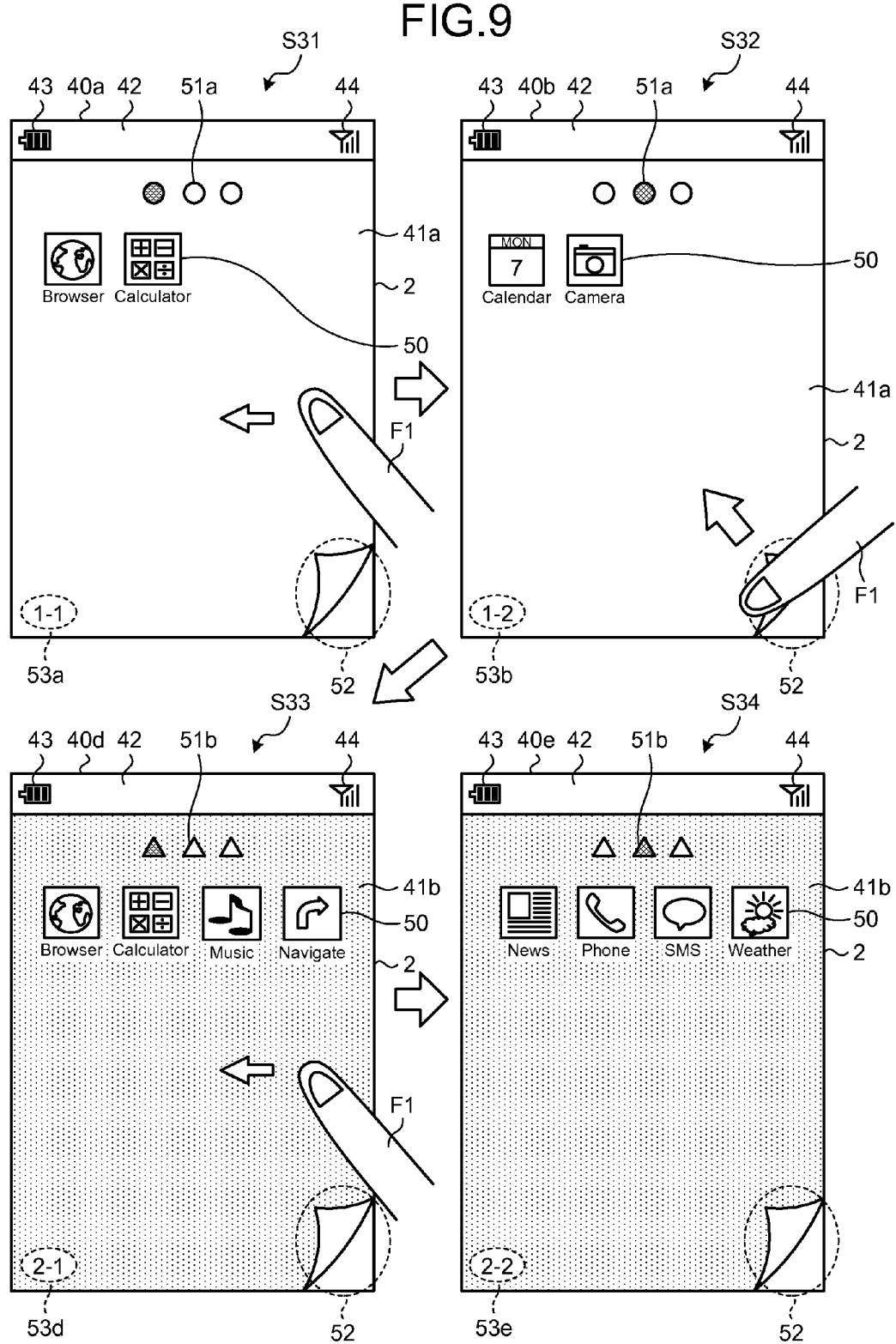
FIG. 9 is a diagram illustrating a third example of control performed by the smartphone.

FIG. 9 is a diagram illustrating a third example of control performed by the smartphone 1 according to the embodiment. As illustrated at Step S31, the smartphone 1 displays the home screen 40a on the display 2A. The "Browser" icon (icon (1)) and the "Calculator" icon (icon (2)) are arranged in the top left area of the home screen 40a and below the locator 51a. The smartphone 1 displays the leftmost home screen 40a on the display 2A at Step S31 and accordingly displays the leftmost symbol of the locator 51a in a state where its circular outline is filled in. The smartphone 1 displays the home screen 40a located at the left end in the first layer on the display 2A at Step S31 and accordingly displays "1-1" as the layer number 53a at the bottom left corner of the screen. The smartphone 1 displays the background 41a set in the first layer in the background of the icons 50 at Step S31.

The finger F1 of the user performs a leftward flick on the home screen 40a at Step S31. When detecting the leftward flick on the home screen 40a, the smartphone 1 displays the home screen 40b located to the right of the home screen 40a, instead of the home screen 40a, on the display 2A. In FIG. 9, omitted is a diagram illustrating a change that the home screen is making from the state illustrated at Step S31 to the state illustrated at S32.

At Step S32, the smartphone 1 displays the home screen 40b on the display 2A. The "Calendar" icon (icon (3)) and the "Camera" icon (icon (4)) are arranged in the top left area of the home screen 40b. At Step S32, the smartphone 1 displays the symbol second from the left of the locator 51a in a state where its circular outline is filled in. At this point, the smartphone 1 displays the leftmost symbol of the locator 51a, which is displayed in a state where its circular outline is filled in at Step S31, as a circular outline. The smartphone 1 displays the home screen 40b located second from the left in the first layer on the display 2A at Step S32 and accordingly displays "1-2" as the layer number 53b at the bottom left corner of the screen.

At Step S32, the finger F1 of the user performs a diagonally left upward flick on the home screen 40b from the area where the object 52 is displayed. The smartphone 1 detects that the number of fingers whose contact has been detected in the area where the object 52 is displayed is one. When detecting the diagonally left upward flick following the single touch with one finger on the object 52 on the home screen 40b, the smartphone 1 displays the home screen 40d being a home screen located at the left end in the second layer, instead of the home screen 40b, on the display 2A. In other words, when the flick gesture in the diagonally left upward direction is a gesture that follows single touch and flicks while moving in the diagonally left upward direction, the smartphone 1 moves to the second layer next after the first layer to change home screens. At this point, the smartphone 1 displays such that the home screen 40b in the first layer is turned and the home screen 40d in the second layer appears from under the home screen 40b. In FIG. 9, omitted is a diagram illustrating a change that the home screen is making from the state illustrated at Step S32 to the state illustrated at S33.

At Step S33, the smartphone 1 displays the home screen 40d on the display 2A. The "Browser" icon, the "Calculator" icon, the "Music" icon (icon (7)), and the "Navigate" icon (icon (8)) are arranged in the top left area of the home screen 40d and below the locator 51b. The smartphone 1 displays the home screen 40d in the second layer on the display 2A at Step S33 and accordingly changes the shape of the symbols of the locator 51b from a circle to a triangle. The smartphone 1 displays the leftmost home screen 40d on the display 2A and accordingly displays the leftmost symbol of the locator 51b in a state where its triangular outline is filled in. The smartphone 1 displays the home screen 40d located at the left end in the second layer on the display 2A at Step S33 and accordingly displays "2-1" as the layer number 53d at the bottom left corner of the screen. The smartphone 1 displays the background 41b set in the second layer in the background of the icons 50 at Step S33.

The finger F1 of the user performs a leftward flick on the home screen 40d at Step S33. When detecting the leftward flick on the home screen 40d, the smartphone 1 displays the home screen 40e being a home screen located to the right of the home screen 40d, instead of the home screen 40d, on the display 2A at Step S33. In FIG. 9, omitted is a diagram illustrating a change that the home screen is making from the state illustrated at Step S33 to the state illustrated at S34.

At Step S34, the smartphone 1 displays the home screen 40e on the display 2A. At Step S34, a "News" icon (icon (9)), a "Phone" icon (icon (10)), a "SMS" icon (icon (11)), and a "Weather" icon (icon (12)) are arranged in the top left area of the home screen 40e. At Step S34, the smartphone 1 displays the symbol second from the left of the locator 51b in a state where its triangular outline is filled in. At this point, the leftmost symbol of the locator 51b, which is displayed in a state where its triangular outline is filled in at Step S33, is displayed as a triangular outline. The smartphone 1 displays the home screen 40e located second from the left in the second layer on the display 2A at Step S34 and accordingly displays "2-2" as the layer number 53e at the bottom left corner of the screen.

The description has thus far been given of the first, second, and third examples of control performed by the smartphone according to the embodiment with reference to FIGS. 7, 8, and 9.

When a flick gesture in the diagonally left upward or diagonally right downward direction (first direction) is performed on a home screen being displayed on the display 2A, the smartphone 1 according to the embodiment moves layers and changes a home screen being displayed to another home screen. On the other hand, when a flick gesture in the left or right direction (second direction) is performed on a home screen being displayed on the display 2A, the smartphone 1 according to the embodiment moves in the lateral direction in the same layer to change a home screen being displayed to another home screen. In this manner, the smartphone 1 can change home screens in accordance with the direction of a flick gesture on one of home screens configured hierarchically, and accordingly can improve the operability upon changing one of the home screens configured hierarchically to another home screen while hierarchically managing the home screens. As the number of applications increases, the number of home screens on which icons are arranged increases conventionally; accordingly, it is difficult to manage the home screens. In contrast, the smartphone 1 according to the embodiment can systematically manage home screens by hierarchically managing the home screens even if the number of the home screens increases.

The smartphone 1 according to the embodiment restricts the arrangement of the same icon on different home screens in the same layer, and controls to permit the arrangement of icons common between different layers in different layers. Consequently, the user can categorize and organize icons by layer. For example, the user can realize the hierarchical management of home screens, which is suitable for various uses, by setting the first layer as a home screen for arranging business-use icons, the second layer as a home screen for arranging private-use icons, and the third layer as a home screen for arranging hobby-use icons. For example, the user can realize the hierarchical management of home screens in accordance with the user of the smartphone 1, by setting the first layer as a home screen for arranging his/her personal icons, the second layer as a home screen for arranging icons for another user, and the third layer as a home screen for arranging shared icons. On the other hand, the number of the same icons that can be arranged on home screens that are not configured hierarchically is only one. Therefore, it is not possible to realize the hierarchical management of home screens, which is suitable for the various uses, or the hierarchical management of home screens in accordance with the use. This is because even if home screens are categorized by use or user, common icons may generally be included.

The smartphone 1 according to the embodiment changes the display mode of a home screen in accordance with a layer to which each of a plurality of home screens, which is displayed on the display 2A. For example, the smartphone 1 can change wall papers by layer, or the shapes, colors, or the like of the symbols of the locator 51, or display the layer numbers identifying the positions of home screens in layers. Consequently, it is possible to cause the user to easily understand that he/she is using a home screen belonging to which layer, and increase user convenience upon use of home screens configured hierarchically.

Figure 10:
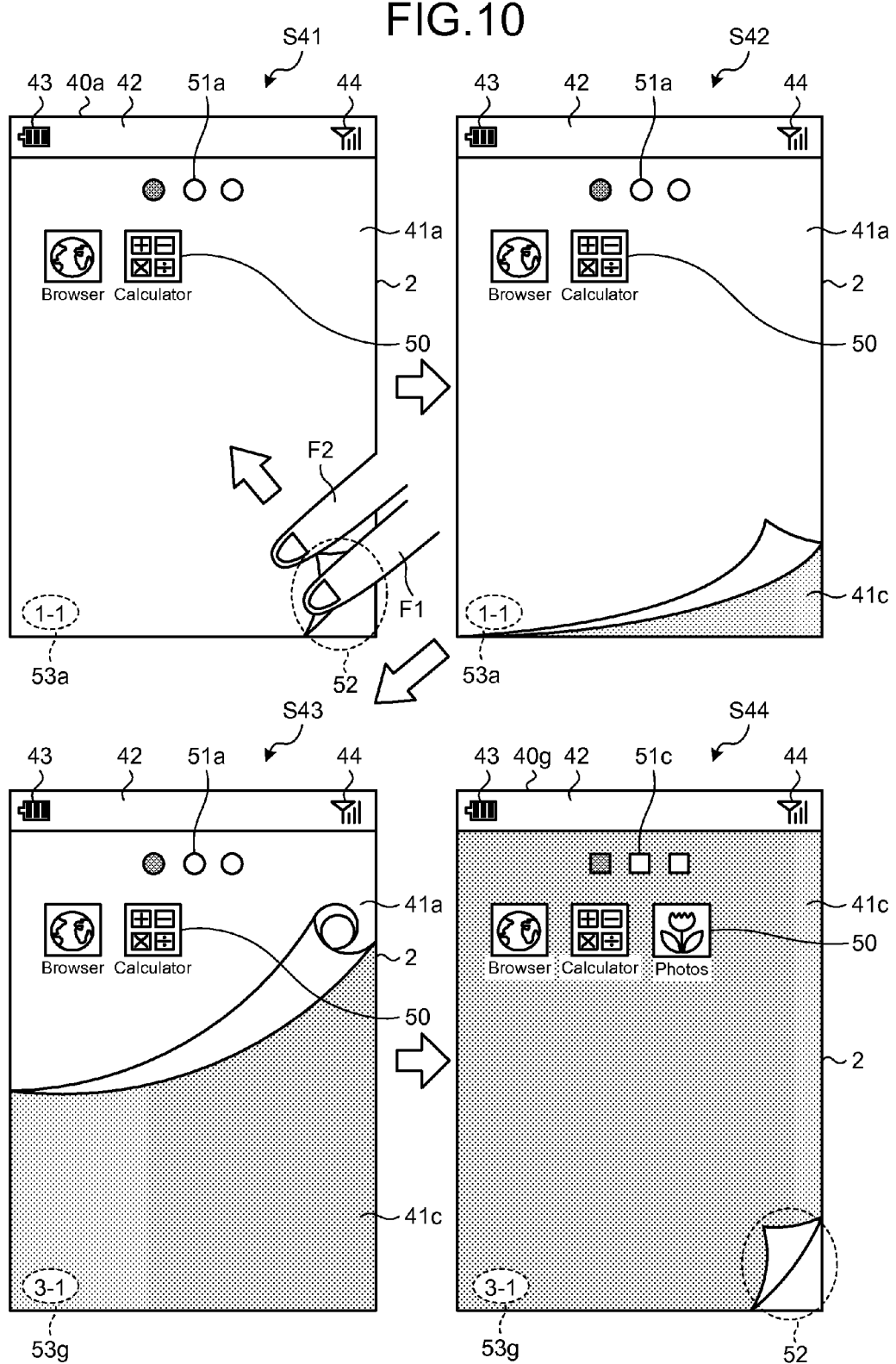
FIG. 10 is a diagram illustrating a fourth example of control performed by the smartphone.

FIG. 10 is a diagram illustrating a fourth example of control performed by the smartphone 1 according to the embodiment. The smartphone 1 displays the home screen 40a on the display 2A at Step S41. The "Browser" icon (icon (1)) and the "Calculator" icon (icon (2)) are arranged in the top left area of the home screen 40a and below the locator 51a. The smartphone 1 displays the leftmost home screen 40a on the display 2A at Step S41 and accordingly displays the leftmost symbol of the locator 51a in a state where its circular outline is filled in. The smartphone 1 displays the home screen 40a located at the left end in the first layer on the display 2A at Step S41 and accordingly displays "1-1" as the layer number 53a at the bottom left corner of the screen. The smartphone 1 displays the background 41a set in the first layer in the background of the icons 50 at Step S41.

At Step S41, the finger F1 and a finger F2 of the user perform a diagonally left upward flick on the home screen 40a from the area where the object 52 is displayed. The smartphone 1 detects that the number of fingers whose contact has been detected in the area where the object 52 is displayed is two. When detecting the diagonally left upward flick following the multi-touch with two fingers on the object 52 on the home screen 40a, the smartphone 1 displays the home screen 40g being a home screen located at the left end in the third layer, instead of the home screen 40a, on the display 2A. In other words, when the flick gesture in the diagonally left upward direction is a gesture that follows multi-touch with two fingers and flicks while moving in the diagonally left upward direction, the smartphone 1 moves to the third layer located two layers away from the first layer, the two layers corresponding to the two fingers upon detection of the multi-touch, and changes home screens. At this point, as illustrated at Steps S42 and S43, the smartphone 1 displays such that the home screen 40a in the first layer is turned and the home screen 40g in the third layer appears from under the home screen 40a.

At Step S42, the area where the icons 50 are arranged on the home screen 40a is displayed to look like curling up from the bottom right corner where the object 52 has been displayed. A part of the home screen 40a curls up; accordingly, a part of the background 41c of the home screen 40g appears.

At Step S43, the home screen 40a is displayed to look like further curling up than Step S42. The home screen 40a further curls up; accordingly, the layer number "3-1" of the home screen 40g appears.

At Step S44, the smartphone 1 displays the home screen 40g on the display 2A. The smartphone 1 displays the home screen 40g on the display 2A at Step S44. The "Browser" icon, the "Calculator" icon, and a "Photos" icon (icon (17)) are arranged in the top left area of the home screen 40g and below the locator 51c. The smartphone 1 displays the home screen 40g in the third layer on the display 2A at Step S44 and accordingly changes the shape of the symbols of the locator 51c from a circle to a square. The smartphone 1 displays the leftmost home screen 40g on the display 2A and accordingly displays the leftmost symbol of the locator 51c in a state where its square outline is filled in. The smartphone 1 displays the home screen 40g located at the left end in the third layer on the display 2A at Step S44 and accordingly displays "3-1" as the layer number 53g at the bottom left corner of the screen. The smartphone 1 displays the background 41c set in the third layer in the background of the icons 50 at Step S44.

As described above, the smartphone 1 according to the embodiment changes a move destination layer in accordance with a flick gesture in the diagonally left upward direction, which is performed on a home screen being displayed on the display 2A. For example, when the flick gesture in the diagonally left upward direction is a gesture that follows multi-touch and flicks while moving in the diagonally left upward direction, the smartphone 1 can move to a layer located layers down from the current layer, the layers corresponding to the number of fingers upon detection of the multi-touch, and change home screens. Similarly, when the flick gesture in the diagonally right downward direction is a gesture that follows multi-touch and flicks while moving in the diagonally right downward direction, the smartphone 1 can move to a layer located layers up from the current layer, the layers corresponding to the number of fingers upon detection of the multi-touch, and change home screens. Consequently, the user can display a home screen in a desired layer instructed by the number of fingers. Therefore, the operability of home screens configured hierarchically further improves.

In the fourth example, the description has been given of the example where the smartphone 1 moves to a layer located layers away from a current layer, the layers corresponding to the number of fingers upon detection of multi-touch, and changes home screens, but change is not limited to this. For example, the smartphone 1 may move to a predetermined layer that is previously associated with the number of fingers upon detection of multi-touch, and change home screens.

In the fourth example, the description has been given of the example where the smartphone 1 changes a move destination layer in accordance with the number of fingers, but change is not limited to this. For example, the smartphone 1 may change a move destination layer in accordance with the number of flick gestures in the diagonal direction. When a flick gesture in the diagonal direction is successively performed several times, the smartphone 1 may move to a layer located layers away from a current layer, the layers corresponding to the number of the several times, and change home screens. When a flick gesture in the diagonal direction is successively performed several times, the smartphone 1 may move to a predetermined layer that is previously associated with the number of the several times, and change home screens.

Figure 11:
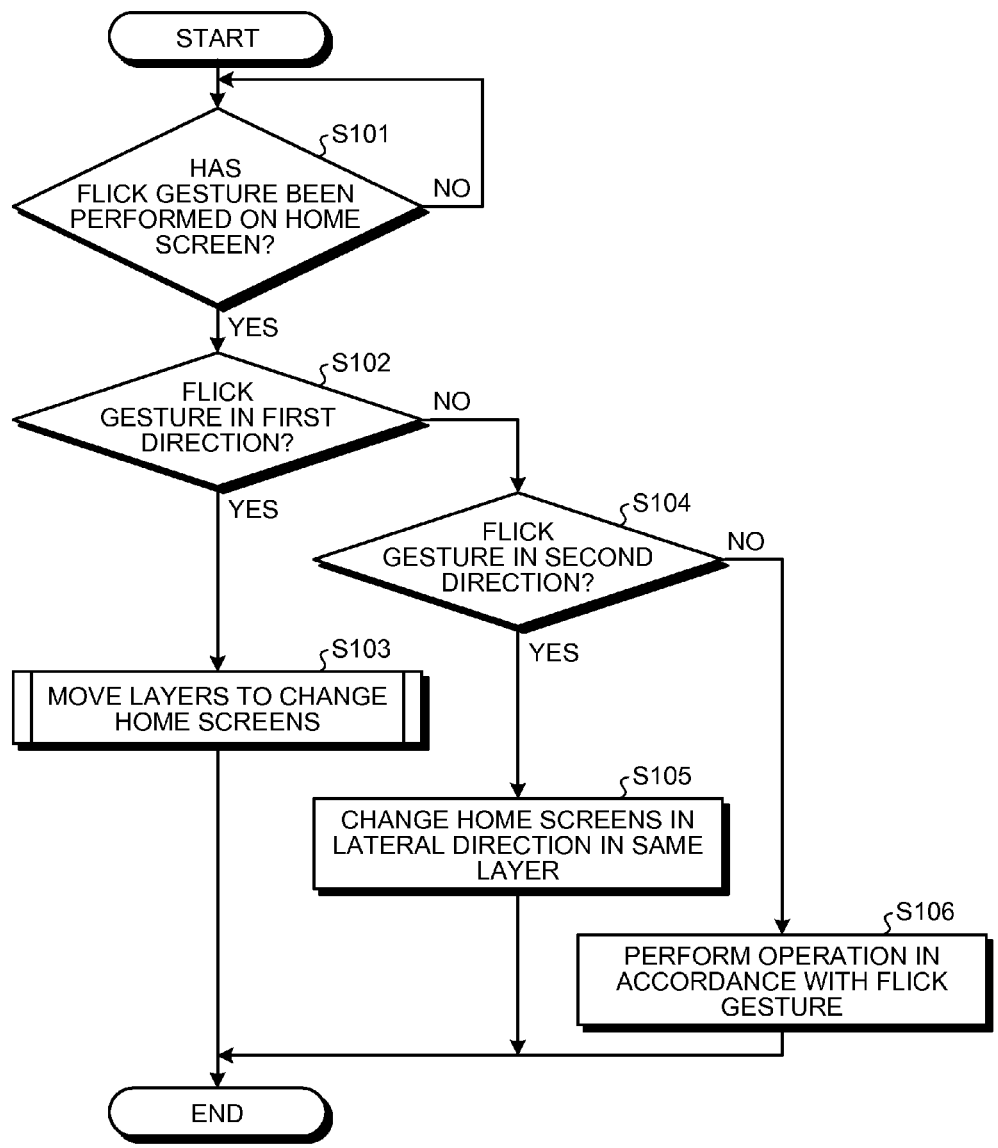
FIG. 11 is a flowchart illustrating a processing procedure of control performed by the smartphone.
Figure 12:
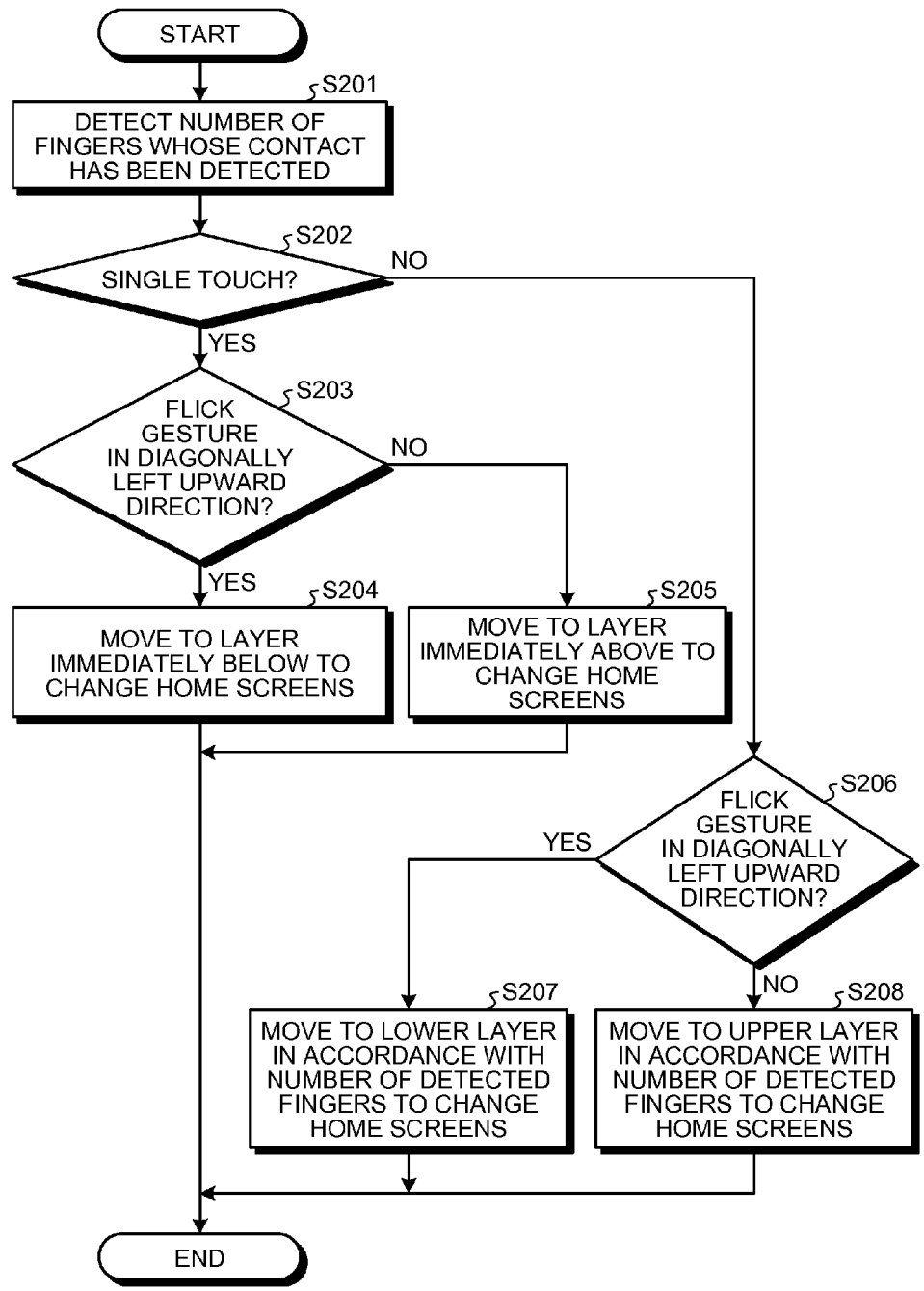
FIG. 12 is a flowchart illustrating the details of the processing procedure of control performed by the smartphone.

A description will hereinafter be given of a processing procedure of the smartphone 1 changing home screens with reference to FIGS. 11 and 12. FIG. 11 is a flowchart illustrating control performed by the controller 10 of the smartphone 1. FIG. 12 is a flowchart illustrating the details of the processing procedure of control performed by the smartphone 1 according to the embodiment. The controller 10 may execute another processing procedure concurrently with the processing procedure illustrated in FIGS. 11 and 12. The following processes are assumed to be repeatedly executed.

At Step S101, the controller 10 of the smartphone 1 determines whether a flick gesture has been performed on the home screen. When it is determined that a flick gesture has not been performed on the home screen (No at Step S101), the controller 10 proceeds to Step S101. In this manner, the controller 10 repeats the process of Step S101 until detecting a flick gesture on the home screen at Step S101.

When it is determined that a flick gesture has been performed on the home screen (Yes at Step S101), the controller 10 proceeds to Step S102. At Step S102, the controller 10 determines whether the flick gesture on the home screen is a flick gesture in the first direction. The flick gesture in the first direction is, for example, a flick gesture in the diagonally left upward or diagonally right downward direction.

When it is determined that the flick gesture on the home screen is a flick gesture in the first direction (Yes at Step S102), the controller 10 proceeds to Step S103. As illustrated in the first and third examples, at Step S103, the controller 10 moves layers in accordance with the detected flick gesture in the first direction, and changes home screens. The controller 10 then ends the series of processes.

When it is determined that the flick gesture on the home screen is not a flick gesture in the first direction (No at Step S102), the controller 10 proceeds to Step S104. At Step S104, the controller 10 determines whether the flick gesture on the home screen is a flick gesture in the second direction. The flick gesture in the second direction is, for example, a flick gesture in the left or right direction.

When it is determined that the flick gesture on the home screen is a flick gesture in the second direction (Yes at Step S104), the controller 10 proceeds to Step S105. As illustrated in the second and third examples, at Step S105, the controller 10 changes home screens in the lateral direction in accordance with the flick gesture in the second direction. The controller 10 then ends the series of processes.

When it is determined that the flick gesture on the home screen is not a flick gesture in the second direction (No at Step S104), the controller 10 proceeds to Step S106. At Step S106, the controller 10 performs an operation in accordance with the flick gesture performed on the home screen. For example, the controller 10 moves a home screen in the same layer in accordance with a flick gesture in the up or down direction on the home screen in conformity with predetermined rules. Examples of the predetermine rules include, but not limited to, specifications of moving to a home screen predetermined number of home screens ahead when a flick gesture in the up direction is detected, and of moving to the leftmost or rightmost home screen when a flick gesture in the down direction is detected. The controller 10 then ends the series of processes.

A detailed description will be given of the process of Step S103 of FIG. 11 with reference to FIG. 12. The controller 10 of the smartphone 1 detects the number of fingers whose contact has been detected by the touch screen 2B, at Step S201, and determines whether to be single touch at Step S202.

When it is determined to be single touch with one finger (Yes at Step S202), the controller 10 proceeds to Step S203. At Step S203, the controller 10 determines whether the flick gesture that follows the single touch on the home screen is a flick gesture in the diagonally left upward direction.

When it is determined to be a flick gesture in the diagonally left upward direction (Yes at Step S203), the controller 10 proceeds to Step S204. As illustrated in the first and third examples, at Step S204, the controller 10 changes the home screen to be displayed on the display 2A to the leftmost home screen belonging to a layer immediately below a layer to which the current home screen belongs. The controller 10 then ends the series of processes.

When it is determined not to be a flick gesture in the diagonally left upward direction (No at Step S203), it is determined to be a flick gesture in the diagonally right downward direction since the first direction is set as the diagonally left upward or diagonally right downward direction, and the controller 10 proceeds to Step S205. At Step S205, the controller 10 changes the home screen to be displayed on the display 2A to the leftmost home screen belonging to a layer immediately above a layer to which the current home screen belongs. The controller 10 then ends the series of processes.

Returning to Step S202, the description of the processes of the controller 10 is continued. When it is determined not to be single touch with one finger (No at Step S202), it is determined to be multi-touch with two or more fingers, and the controller 10 proceeds to Step S206. At Step 206, the controller 10 determines whether the flick gesture that follows the multi-touch on the home screen is a flick gesture in the diagonally left upward direction.

When it is determined to be a flick gesture in the diagonally left upward direction (Yes at Step S206), the controller 10 proceeds to Step S207. As illustrated in the fourth example, at Step S207, the controller 10 moves to a layer located layers down from the current layer, the layers corresponding to the number of fingers detected at Step S201, and changes the home screen to be displayed on the display 2A to another home screen. For example, when the number of fingers detected at Step S201 is two, the controller 10 moves to a layer located two layers down from the current layer, the two layers corresponding to two fingers, and changes the home screen to be displayed on the display 2A to a home screen located at the left end in the move destination layer. The controller 10 then ends the series of processes.

When it is determined not to be a flick gesture in the diagonally left upward direction (No at Step S206), it is determined to be a flick gesture in the diagonally right downward direction since the first direction is set as the diagonally left upward or diagonally right downward direction, and the controller 10 proceeds to Step S208. At Step S208, the controller 10 moves to a layer located layers up from the current layer, the layers corresponding to the number of fingers detected at Step S201, and changes home screens. For example, when the number of fingers detected at Step S201 is two, the controller 10 moves to a layer located two layers up from the current layer, the two layers corresponding to two fingers, and changes the home screen to be displayed on the display 2A to a home screen located at the left end in the move destination layer. The controller 10 then ends the series of processes.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

The first to fourth examples may be combined, respectively, as appropriate.

In the first, third, and fourth examples, the description has been given of the example where, when a flick gesture in the diagonal direction (first direction) is performed on a home screen being displayed on the display 2A, the smartphone 1 moves layers and changes the home screen being displayed to another home screen. However, the gesture is not limited to this. For example, when a long tap is performed on the object 52 on a home screen being displayed on the display 2A, the smartphone 1 may move to the next layer and change the home screen being displayed to another home screen. In the second and third examples, the description has been given of the example where, when a flick gesture in the lateral direction (second direction) is performed on a home screen being displayed on the display 2A, the smartphone 1 moves in the lateral direction in the same layer and changes the home screen being displayed to another home screen. However, the gesture is not limited to this. For example, when a tap is performed on the object 52 on a home screen being displayed on the display 2A, the smartphone 1 may move in the lateral direction in the same layer and change the home screen being displayed to another adjacent home screen.

In the first, third, and fourth examples, the description has been given assuming that the diagonal direction of the home screen is the first direction. However, the present invention is not limited to this. For example, the up and down directions of the home screen may be the first direction. In the first, second, and third examples, the smartphone 1 displays such that the displayed home screen is turned and another home screen appears from under the displayed home screen when moving layers and changing home screens. However, the present invention is not limited to this. For example, the smartphone 1 may gradually increase the transparency of a home screen being displayed to display such that another home screen appears from under the displayed home screen. In the fourth example, the object 52 is displayed at the bottom right corner of the home screen in the third layer being the last layer. However, the display is not limited to this. It is not necessary for the smartphone 1 to display the object 52 when in the last layer of home screens configured hierarchically.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
    a touch screen display configured to display a plurality of home screens in multiple layers placed one over another, wherein each of the multiple layers includes several home screens; and
    a controller configured to
        display a home screen among the home screens in a layer on the touch screen display,
        display a different home screen among the home screens in the same layer when a first gesture is performed on the home screen displayed on the touch screen display, and
        directly display a leftmost home screen among the home screens in a different layer when a second gesture is performed on any home screen displayed on the touch screen display.

2. The device of claim 1, wherein the controller is further configured to detect a number of touches on the touch screen display and to display the leftmost home screen in a layer corresponding, to the detected number of touches.

3. The device of claim 1, wherein the controller is further configured to cause the touch screen display to display an indicator indicating a number of the layer having the home screen currently displayed on the touch screen display.

4. The device of claim 1, wherein
    the different layer is immediately placed below or above the layer to which the home screen belongs.

5. A method of controlling a device including a touch screen display displaying a plurality of home screens in multiple layers placed one over another, wherein each of the multiple layers includes several home screens, the method comprising:
    displaying a home screen among the home screens in a layer on the touch screen display;
    displaying a different home screen among the home screens in the same layer when a first gesture is performed on the home screen displayed on the touch screen display; and
    directly displaying a leftmost home screen among the home screens in a different layer when a second gesture is performed on any home screen displayed on the touch screen display.

6. The method of claim 5, further comprising:
    detecting a number of touches on the touch screen display; and
    displaying the leftmost home screen in a layer corresponding to the detected number of touches.

7. The method of claim 5, further comprising:
    displaying, on the touch screen display, an indicator indicating a number of the layer having the home screen currently displayed on the touch screen display.

8. The method of claim 5, wherein
    the different layer is immediately placed below or above the layer to which the home screen belongs.

9. A non-transitory storage medium that stores a program for causing, when executed by a device including a touch screen display displaying a plurality of home screens in multiple layers placed one over another, wherein each of the multiple layers includes several home screens, the device to execute:
    displaying a home screen among the home screens in a layer on the touch screen display;
    displaying a different home screen among the home screens in the same layer when a first gesture is performed on the home screen displayed on the touch screen display; and
    directly displaying a leftmost home screen among the home screens in a different layer when a second gesture is performed on any home screen on the touch screen display.

10. The non-transitory storage medium of claim 9, wherein the program, when executed by the device, further causes the device to execute
    detecting a number of touches on the touch screen display; and
    displaying the leftmost home screen in a layer corresponding to the detected number of touches.

11. The non-transitory storage medium of claim 9, wherein the program, when executed by the device, further causes the device to execute
    causing the touch screen display to display an indicator indicating a number of the layer having the home screen currently displayed on the touch screen display.

12. The non-transitory storage medium of claim 9, wherein
    the different layer is immediately placed below or above the layer to which the home screen belongs.

* * * * *